United States Patent [19]
Lee et al.

[11] Patent Number: 5,602,913
[45] Date of Patent: Feb. 11, 1997

[54] ROBUST DOUBLE-TALK DETECTION

[75] Inventors: Ho Lee; Budi Hardiman, both of San Diego, Calif.

[73] Assignee: Hughes Electronics, Los Angeles, Calif.

[21] Appl. No.: 310,614

[22] Filed: Sep. 22, 1994

[51] Int. Cl.⁶ .................................. H04M 1/58
[52] U.S. Cl. ................ 379/406; 379/410; 379/411; 379/59; 379/60
[58] Field of Search .................. 379/406, 410, 379/411, 409, 408, 407, 402, 58, 59, 60, 61

[56] References Cited

U.S. PATENT DOCUMENTS

| 5,014,263 | 5/1991 | Vairavan et al. | 379/411 |
|---|---|---|---|
| 5,263,079 | 11/1993 | Umemoto | 379/411 |
| 5,278,900 | 1/1994 | Van Gerwen et al. | 379/411 |
| 5,353,348 | 10/1994 | Sendyk et al. | 379/411 |
| 5,390,250 | 2/1995 | Janse et al. | 379/411 |

*Primary Examiner*—Krista M. Zele
*Assistant Examiner*—Jacques M. Saint-Surin
*Attorney, Agent, or Firm*—Gordon R. Lindeen, III; Wanda K. Denson-Low

[57] ABSTRACT

A device and method for detecting and suppressing double-talk in a cellular mobile unit employ a cellular transceiver; a receive signal path; a transmit signal path; and a double-talk detector. The double-talk detector determines a receive slope of a receive signal, and determines a transmit slope of a transmit signal. The double-talk detector further determines a difference slope of a difference signal that is determined by evaluating differences between the receive signal and the transmit signal. Finally, the double-talk detector generates a double-talk flag signal in the event the transmit slope indicates an increasing transmit speech power, and the receive slope and the difference slope indicate a prescribed relationship between the changes in the receive speech power and the difference power.

17 Claims, 5 Drawing Sheets

ROBUST DOUBLE-TALK DETECTION

BACKGROUND OF THE INVENTION

The present invention relates double-talk detection in transceivers, and more particularly to double-talk detection in hands-free wireless transceivers. Even more particularly, the present invention relates to robust double-talk detection in hands-free cellular telephone transceivers.

Cellular telecommunication systems in North America are evolving from their current analog frequency modulated (FM) form towards digital systems. Digital systems must encode speech for transmission and then, at the receiver, synthesize speech from the received encoded transmission. For the system to be commercially acceptable, the synthesized speech must not only be intelligible, it should be as close to the original speech as possible.

Codebook Excited Linear Prediction (CELP) is a technique for speech encoding. The basic technique consists of searching a codebook of randomly distributed excitation vectors for that vector which produces an output sequence (when filtered through pitch and linear predictive coding (LPC) short-term synthesis filters) that is closest to the input sequence. To accomplish this task, all of the candidate excitation vectors in the codebook must be filtered with both the pitch and LPC synthesis filters to produce a candidate output sequence that can then be compared to the input sequence. This makes CELP a very computationally-intensive algorithm, with typical codebooks consisting of 1024 entries, each 40 samples long. In addition, a perceptual error weighing filter is usually employed, which adds to the computational load.

A number of techniques have been considered to mitigate the computational load of CELP encoders. Fast digital signal processors have helped to implement very complex algorithms, such as CELP, in real-time. Another strategy is a variation of the CELP algorithm called Vector-Sum Excited Linear Predictive (VSELP) Coding. An EIA/TIA IS-54 standard that uses a full rate 8.0 Kbps VSELP speech coder, convolutional coding for error protection, differential quadrature phase shift keying (QPSK) modulation, and a time division, multiple access (TDMA) scheme has been adopted by the Telecommunications Industry Association (TIA). See EIA/TIA IS-54B. The Electronic Industries Association (EIA) published EIA/TIA IS-55 for the dual-mode mobile station, base station cellular telephone system compatibility standard. This standard incorporates a VSELP codebook search method that is disclosed in U.S. Pat. No. 4,817,157 by Gerson.

The CELP-based coders, which use LPC coefficients to model input speech, are adequate for clean signals, however, when background noise is present in the input signal, the CELP-based coders inadequately model the signal. This results in some artifacts at the receiver after decoding. These artifacts, referred to a swirl artifacts, considerably degrade the perceived quality of the transmitted speech. U.S. patent application Ser. No. 08/169,789 of Ganesen et al., entitled REMOVAL OF SWIRL ARTIFACTS FROM CELP BASED SPEECH CODERS and filed Dec. 20, 1993, commonly assigned with the present patent document, and incorporated herein by reference, improves upon conventional CELP-based speech coders, and removes the swirl artifacts through the use of a voice activity detector (VAD).

In hands-free telecommunication, a high-sensitivity microphone and a high-volume, i.e., loud, speaker are employed, which allow a mobile user to hear incoming (or far-end) communications, and to transmit outgoing (or near-end) communications without the need for the mobile user to hold a handset to his or her ear and mouth.

Problematically, hands-free transceivers are susceptible to local acoustic echo (or a false double talk condition), which is caused by far-end audible signals, e.g., voice signals from a remote unit, being sounded through the mobile unit's speaker and simultaneously received (or fed back) into the mobile unit's microphone. As a result, the audible signals are retransmitted to the remote user causing an echo of the far-end audible signals. This problem arises because near-end speech, i.e., speech received through the microphone, can be caused by the mobile (or near-end) user or by the mobile unit's speaker, i.e., by the far-end user. Conventional hands-free mobile units are unable to distinguish between signals originating at the near end and signals originating at the far end, and, in order to make such a distinction, very complex processor-intensive processing would need to be performed.

In one type of conventional hands-free mobile unit, the microphone is "turned off," i.e., acoustic signals received into the mobile unit's microphone are not transmitted, whenever incoming voice signals are detected by a receive speech detector. This prevents the mobile unit from re-transmitting (or echoing) the incoming (far-end) voice signals after they are sounded by the mobile unit's speaker. As a result, echo, or feedback of the far-end user's transmission, is prevented. Unfortunately however, in such an implementation, the mobile (or near-end) user is unable to "interrupt" the remote (or far-end) user, because the mobile user's microphone is "turned off" whenever the far-end voice signals are received, i.e., whenever the remote user is transmitting. Thus, the mobile user must wait to transmit until the remote user stops transmitting.

Such an implementation becomes particularly problematic when the mobile user is attempting to communicate with another mobile user who is using a similarly configured hands-free cellular transceiver, because both cellular transceivers will occasionally "turn off" their microphones in response to detected double talk, i.e., in response to each detecting an incoming signal. In this case, communication will "lock up" until one or the other of the cellular transceivers ceases echo suppression, i.e., turns its microphone back on. Problematically, such "lock up" may not be readily detectable by either mobile user, because both users may be talking and assume that their signals are being heard through the opposite mobile user's speaker.

Thus, improvements are needed in double-talk detection and echo suppression for hands-free cellular telephone transceivers, and other communications transceivers that exhibit local acoustic echo and/or false double talk conditions.

SUMMARY OF THE INVENTION

The present invention advantageously addresses the needs above as well as other needs by providing a robust double-talk detection device and method for use in hands-free cellular telephone transceivers.

The invention may be characterized as a method of detecting double-talk within a cellular mobile unit including measuring first and second average transmit speech powers over first and second time periods, respectively.

The method further includes measuring first and second average receive speech powers over the first and second time periods, respectively.

The method also includes determining first and second difference powers in the first and second average transmit speech powers and the first and second average receive speech powers, respectively, by subtracting the first and second average receive speech powers from the first and second average transmit speech powers, respectively.

The method further includes comparing the first average transmit speech power to the second average transmit speech power, and comparing the first average receive speech power to the second average receive speech power.

The method also further includes comparing the first difference power to the second difference power.

In response to such comparing the method includes generating a transmit (or microphone) slope signal indicating a change in transmit speech power over time, and generating a receive (or speaker) slope signal indicating a change in receive speech power over time. In addition, the method includes generating a difference slope signal indicating a change in difference power over time.

Finally, the method includes generating a double-talk flag signal in the event the transmit slope signal indicates an increasing transmit speech power, and the receive slope signal and the difference slope signal indicate a prescribed relationship between the changes in the receive speech power and the difference power, e.g., both increasing or both decreasing. In this way, double-talk is detected and suppressed by the above-described method of the present invention.

The invention may also be characterized as a device for detecting and suppressing double talk within a cellular mobile unit. The device includes: a cellular transceiver; a receive signal path coupled to the cellular transceiver; a transmit signal path coupled to the cellular transceiver; and a double-talk detector coupled to the receive and transmit signal paths.

The transmit signal path includes means for attenuating the transmit signal, and the receive signal path includes means for attenuating the receive signal.

The double-talk detector includes means for determining a receive slope of a receive signal in the receive signal path, and for generating a receive slope signal in response thereto. In addition, the double-talk detector includes means for determining a transmit slope of a transmit signal in the transmit signal path, and for generating a transmit slope signal in response thereto. The double-talk detector further includes means for determining a difference slope of a difference signal, and for generating a difference slope signal in response thereto. The means for determining the difference slope includes means for determining the difference signal by evaluating differences between the receive signal and the transmit signal over time, respectively. Finally, the double-talk detector includes means for generating a double-talk flag signal in the event the transmit slope signal indicates an increasing transmit speech power, and the receive slope signal and the difference slope signal indicate a prescribed relationship between the changes in the receive speech power and the difference power, e.g., both indicate increasing power or both indicate decreasing power. The device is thus able to detect double talk in a hands-free communications environment.

BRIEF DESCRIPTION OF THE DRAWINGS

The above and other aspects of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description of the presently contemplated best mode of practicing the invention is not to be taken in a limiting sense, but is made merely for the purpose of describing the general principles of the invention. The scope of the invention should be determined with reference to the claims.

Figure 1:
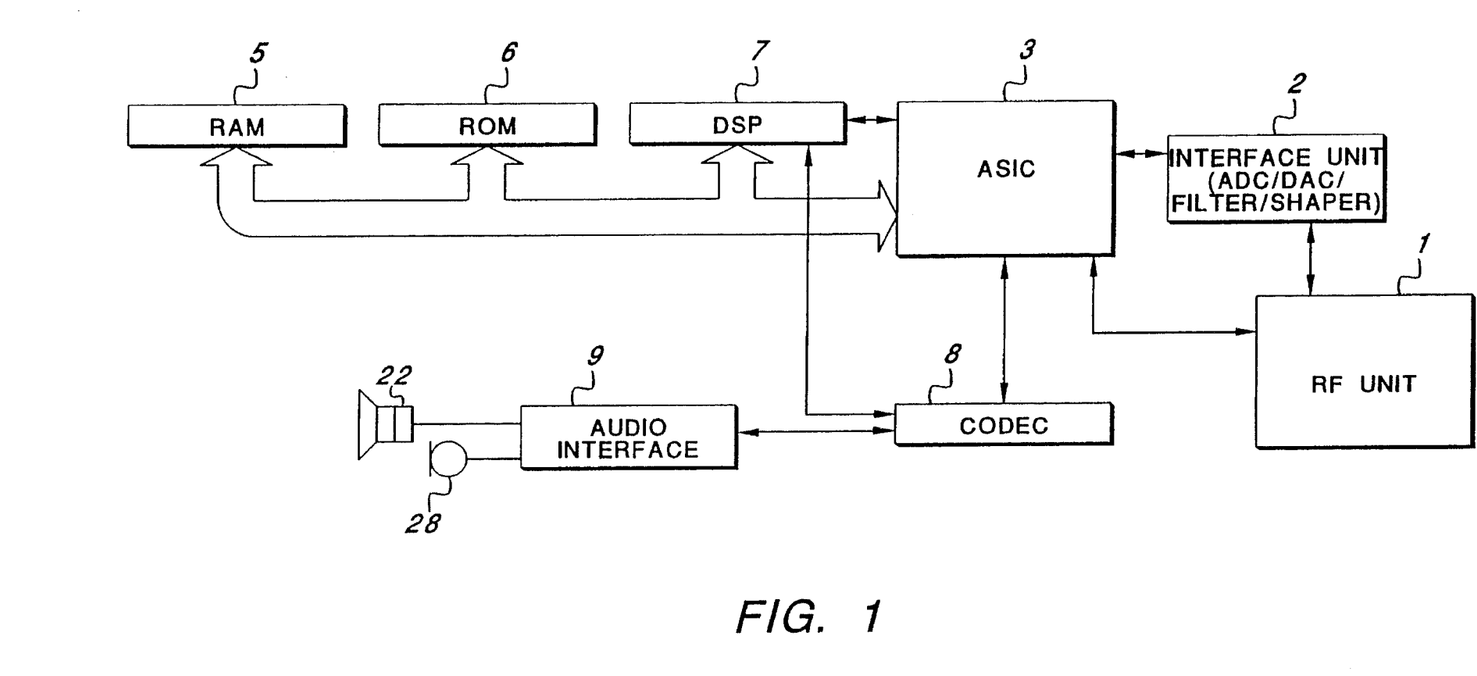
FIG. 1 is a block diagram of a cellular mobile unit in which the present invention can be utilized.

Referring next to FIG. 1, a block diagram is shown of an exemplary cellular mobile unit, in which the teachings of the present invention can be utilized. A radio frequency (RF) unit 1 is shown coupled to an interface unit 2, which is in turn coupled to an application specific integrated circuit (ASIC) 3. The RF unit 1 can also be directly coupled to the application specific integrated circuit 3. A digital signal processor (DSP) 7 is coupled through a data bus 4 to a random access memory (RAM) 5, a read only memory (ROM) 6, and the application specific integrated circuit 3. The application specific integrated circuit 3 is also coupled to coder-decoders (CODECs) 8, which are coupled through an audio interface 9 to a microphone 28 and a speaker 22.

The RF unit 1 of the cellular mobile unit of FIG. 1 performs conventional radio frequency communications, as are known in the art. The interface unit 2 performs digital to analog conversions, analog to digital conversions, filtering and wave shaping, as dictated by the RF unit 1 and the application specific integrated circuit 3. The application specific integrated circuit 3 is used to implement an FM frequency shift keying (FSK) receiver, an FM message processor, transmit and receive timing generators, interfaces to the CODECs 8, buffering of received samples, fade detection circuitry, FEC encoding and decoding, a fixed point divider unit (for VSELP), a phase lock loop (for generation of a CODEC clock), miscellaneous input/output circuitry, and glue logic for processor interfaces.

The digital signal processor (DSP) 7 is utilized within the cellular transceiver to perform the following functions: VSELP analysis/synthesis, hands-free voice switching, demodulation/equalization, FM audio transmission/reception, FM SAT detection and generation, FM FSK transmission, FM message handling/call processing, digital call processing/control, user interface, monitor/diagnostic/testing, SACCH encoding/decoding/queuing, authentication and key generation, signaling privacy, voice recognition, and voice response. The read only memory (ROM) 6 is used for storage of control software as well as RAM-based overlay code. The read only memory 6 may include an electronically erasable programmable read only memory (EEPROM) (not shown) that can be used for storage of ESN/user information and factory calibration settings. The random access memory (RAM) 6 is used for data storage and program memory overlays. The coder/decoders (CODECs) 8 are used for modulation and wave shaping of transmitted and received signals, as is known in the art. The audio interface 9 includes a linear coder/decoder for voice samples and other interfaces such as filters and multiplexers for interfacing to the microphone 22 and speaker 28.

Figure 2:
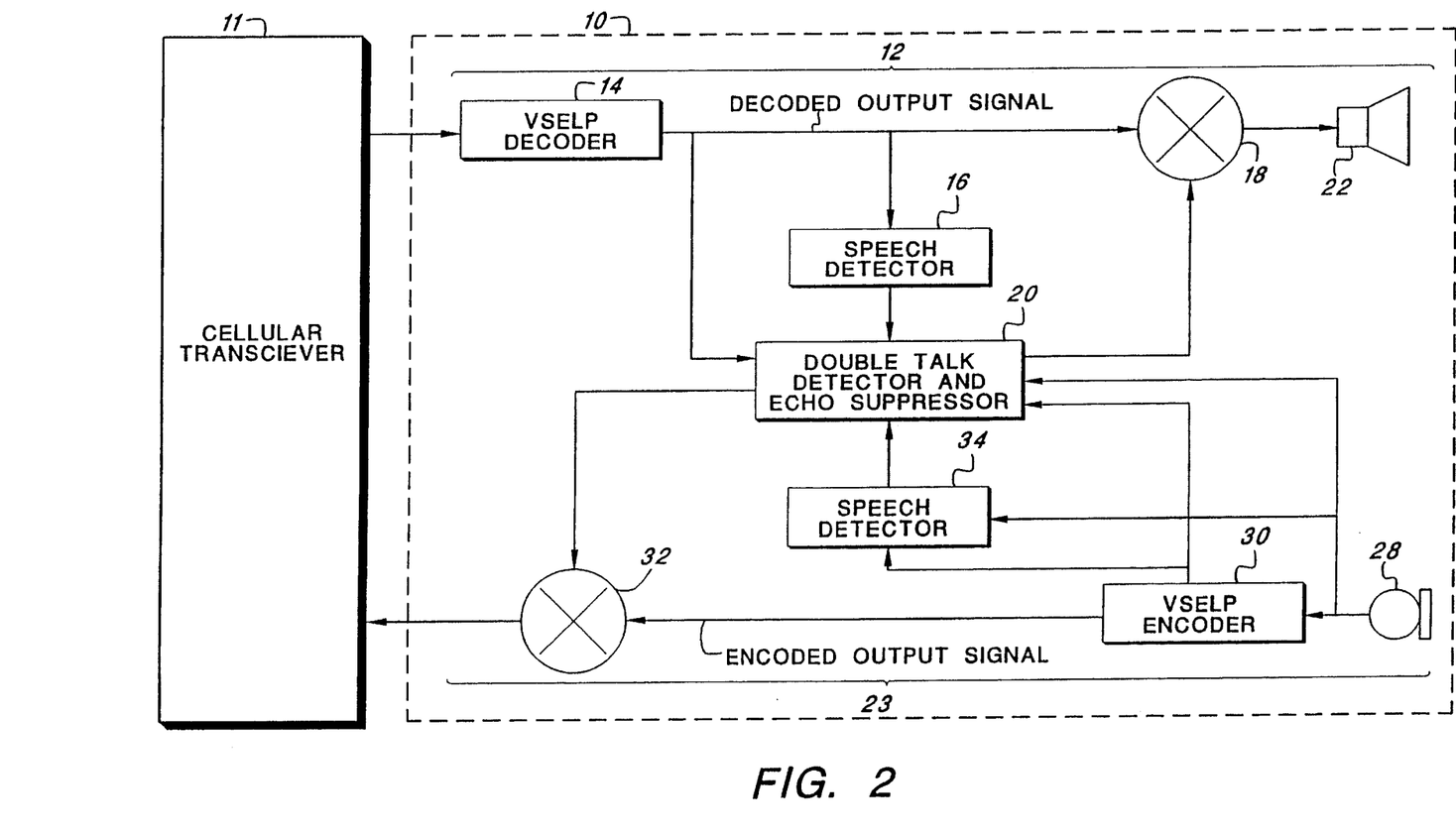
FIG. 2 is a functional block diagram of a double-talk control section of a cellular mobile unit made in accordance with the invention.

Referring first to FIG. 2, a functional block diagram is shown of a double-talk control section 10 of a cellular mobile unit. The double-talk control section 10 is coupled to a cellular transceiver section 11 of the mobile unit. Such cellular transceiver section may, e.g, comprise the components illustrated in FIG. 2

In a receive path 12 of the double-talk control section 10, an incoming voice signal is passed from the cellular transceiver section 11 into a Vector-Sum Excited Linear Predictive (VSELP) decoder 14. Such VSELP decoders 14 are well known in the art of digital cellular communications. See generally U.S. Pat. No. 4,817,157 by Gerson, incorporated herein by reference. The VSELP decoder 14 decodes incoming voice signals from the cellular transceiver section 11 using conventional codebook techniques, and generates a decoded output signal in response thereto. The VSELP decoder 14 is coupled to a receive speech detector 16, e.g., a receive voice activity detector (VAD), (see, e.g., U.S. patent application Ser. No. 08/169,789, previously incorporated herein by reference), a transmit multiplier 18 (also referred to as a multiplexer), and a double-talk detector/echo suppressor 20. The decoded output signal is passed by the VSELP decoder 14 to the receive speech detector 16, the transmit multiplier 18, and the double-talk detector/echo suppressor 20.

The receive speech detector 16 detects the presence of speech in the decoded output signal, as described, e.g., in U.S. patent application Ser. No. 08/169,789. For purposes of this invention it should be understood that the receive voice activity detector (VAD) detects speech in a noisy environment. Because, the linear predictive coding (LPC) coefficients (see IS-54B) of noise in a mobile environment are constant relative to the LPC coefficients of speech, it is possible to employ an adaptive filtering process using the LPC coefficients from a noisy frame to increase the signal to noise (SNR) ratio of an incoming signal. By removing the noise from the incoming signal, the accuracy of the receive speech detector's speech detection is improved. A receive speech flag is set if the energy of the filtered incoming signal signal exceeds an adapted threshold.

The double-talk detector/echo suppressor 20 is coupled to the receive multiplier 18 and passes a receive attenuation signal thereto, as is described more completely below. Note that the output of the multiplier 18 is shown coupled directly to a speaker 22, i.e., a hands-free or high-volume speaker. However, it will be understood by those skilled in the art that additional commonly known circuity is required between the speaker 22 and the multiplier 18. For example, a digital to analog converter, and an amplifier will generally be needed to produce audible signals from the speaker 22. Such commonly known circuitry is omitted, for the sake of simplicity, from the block diagram of FIG. 2, but should be understood to be included in the illustrated embodiment.

In a transmit path 23, an outgoing voice signal (from a microphone 28, i.e., a hands-free or high-sensitivity microphone) is received into a VSELP encoder 30, and is encoded by the VSELP encoder 30 so as to generate an encoded output signal. Such VSELP encoders are well known in the art. See, e.g., the '157 patent, previously incorporated herein by reference. The VSELP encoder 30 is coupled to a transmit multiplier 32 and passes the encoded output signal thereto. The outgoing voice signal (from the microphone 28) is passed to a transmit speech detector 34 (or voice activity detector or VAD), and to the double-talk detector/echo suppressor 20. Along with the outgoing voice signal, the VSELP encoder 30 passes control parameters, such as the frame energy R(0), defined, by way of example, in equation 2.1.3.3.2.5-1 of IS-54B, to the transmit speech detector 34 and the double-talk detector/echo suppressor 20. The passage of such control parameters facilitates efficient processing within the double-talk detector/echo suppressor 20, and the transmit speech detector 34, because such control parameters need not be regenerated by the double-talk detector/echo suppressor 20, and the transmit speech detector 34, after having been once-generated by the VSELP encoder 30.

As shown in FIG. 2, the microphone 28 is coupled directly to the VSELP encoder 30, the transmit speech detector 34, and the double-talk detector/echo suppressor 20. One skilled in the art will, however, understand that other commonly known circuitry is coupled between the microphone 28, and the VSELP encoder 30, the transmit speech detector 34, and the double-talk detector/echo suppressor 20. For example, an amplifier and an analog-to-digital converter will generally be understood to be coupled between the microphone 28, and the VSELP encoder 30, the transmit speech detector 34, and the double-talk detector/echo suppressor 20. Such commonly known circuitry is omitted from FIG. 2, for the sake of simplicity, but should be generally understood to be included in the illustrated embodiment.

The transmit speech detector 16 detects the presence of speech in the outgoing voice signal, as described in U.S. patent application Ser. No. 08/169,789. As with the receive speech detector 34, it should be understood that the transmit voice activity detector (VAD) detects speech in a noisy environment. Because the LPC coefficients of noise in the mobile environment are constant relative to the LPC coefficients of speech, it is possible to employ the adaptive filtering process using the LPC coefficients from a noisy frame to increase the signal to noise (SNR) ratio. By removing the noise from the outgoing signal, the accuracy of the transmit speech detector's speech detection is improved. A transmit speech flag is set if the energy of the filtered outgoing signal exceeds an adapted threshold.

The double-talk detector/echo suppressor 20 is coupled to the transmit multiplier 32 and passes a transmit attenuation signal thereto, as is described more completely below.

Note that the double-talk detector/echo suppressor 20, the transmit multiplier 18, the receive multiplier 32, the VSELP decoder 14, the VSELP encoder 30, and the receive and transmit speech detectors 16, 34 are preferably implemented using software routines, while a hardware implementation may also be used to carry out the teachings of the invention. The software routines may be stored within the random access memory or read only memory and may execute on the digital signal processor (See FIG. 1). Further note that the speech detectors 16, 34 may be any type of speech detectors, such as simple threshold detectors or more complex voice detection routines or hardware, such as those known in the art.

Figure 3:
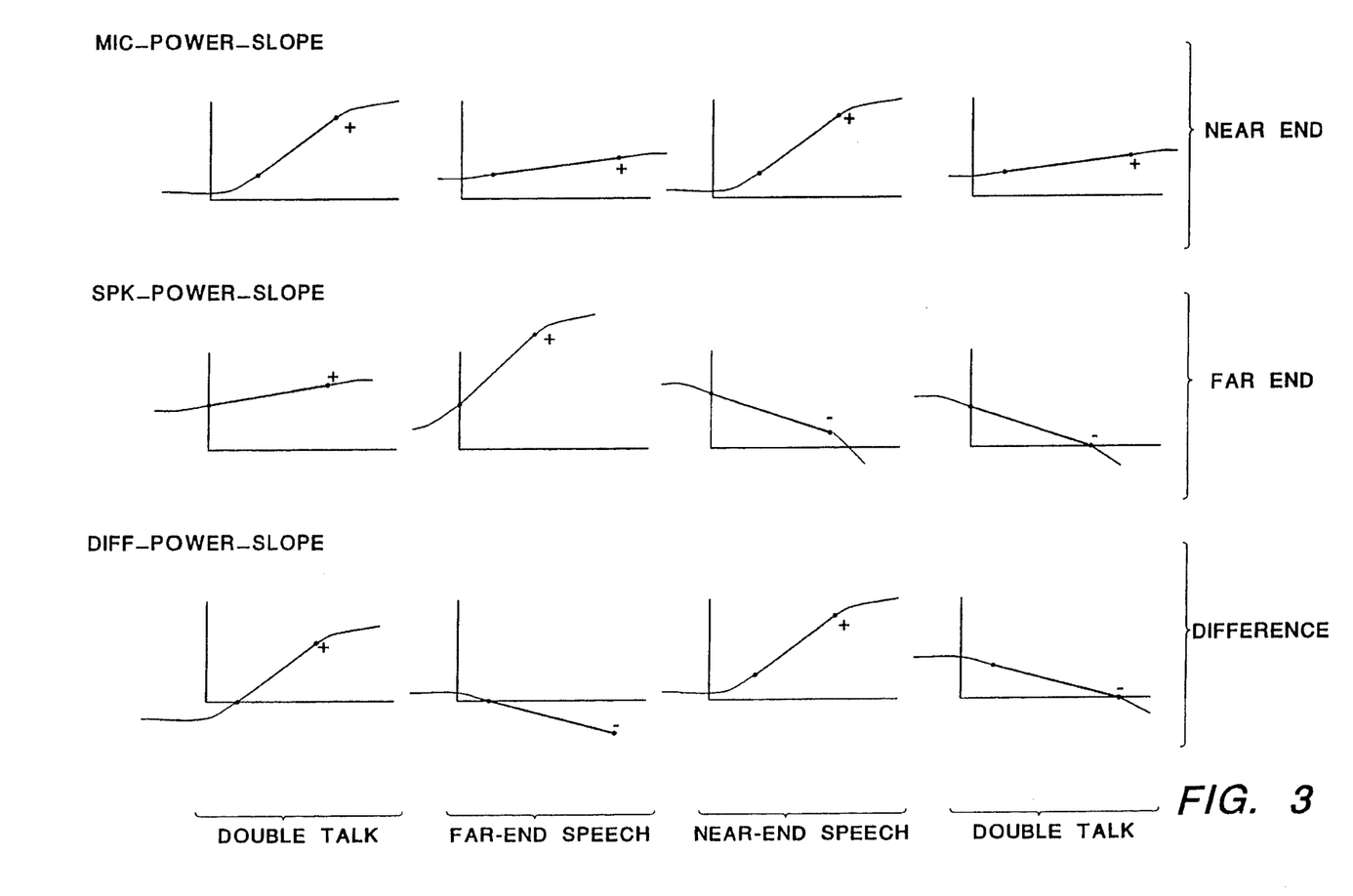
FIG. 3 is a set of graphs showing slopes of microphone power and speaker power, and the slope of the difference between microphone power and speaker power, which are used by a double-talk detector of the double-talk control section of FIG. 1 to determine whether a double-talk condition exists.

Referring next to FIG. 3, set of graphs is shown of the slope of microphone power (or average transmit speech power) averaged over a period of time, e.g., over a 200 mS frame, and speaker power (or average receive speech power) averaged over the period of time, and the slope of the difference between the averaged microphone power and the averaged speaker power. These slopes are determined by the double-talk detector/echo suppressor 20 (FIG. 2) to be either positive slopes or negative slopes.

Such determination is made over time in response to the decoded output signal (from which the double-talk detector/echo suppressor 20 (FIG. 2) determines averaged speaker power) and over time in response to the outgoing voice signal (from which the double-talk detector/echo suppressor 20 (FIG. 2) determines averaged microphone power). The control parameters, specifically frame energy R(0), referred to above, provide an indication of the microphone power. Thus, the frame energy R(0) is averaged over over time to determine the averaged microphone power. Similar control parameters, specifically frame energy R(0) from the VSELP decoder 14, provide an indication of speaker power. Thus, the frame energy R(0) from the VSELP decoder 14 is averaged over time to determine the averaged speaker power. The measuring of first and second average transmit powers is represented by way of example in equations (1).

$$prev\_ave\_mic_{13} R0 = prev_{13} ave[TX\_R(0)] \quad (1)$$
$$ave\_mic\_R0 = ave[TX\_R(0)]$$

The measuring of first and second average receive powers is represented by way of example in equations (2).

$$prev\_ave\_spk\_R0 = prev\_ave[RX\_R(0)] \quad (2)$$
$$ave\_spk\_R0 = ave[RX\_R(0)]$$

Note that frame energy R(0) is mentioned herein as an example of the type of paramater that can be passed to the double-talk detector/echo suppressor 20 as an indication of microphone and/or speaker power. It should be understood, however, that any paramater indicative of the energy of received and transmitted voice signals is useable by the present invention to generate the microphone and speaker power signals. It should also be understood that the teachings of the present invention are not limited to applications wherein VSELP coding techniques are utilized, nor even to applications wherein CELP coding techniques are utilized.

Within the double-talk detector/echo suppressor 20 (FIG. 2), the difference between the averaged microphone power and the averaged speaker power, i.e., difference power, is determined, and a difference power signal is generated in response thereto. The determining of first and second difference powers is represented by way of example in equations (3).

$$prev\_ave\_diff\_R0 = prev\_ave\_mic\_R0 - prev\_ave\_spk\_R0 \quad (3)$$
$$ave\_diff\_R0 = ave\_mic\_R0 - ave\_spk\_R0$$

Note that the difference power as determined by the double-talk detector/echo suppressor 20 is defined (in equation (3)) to be positive when the averaged microphone power minus the averaged speaker power is positive. It should be understood, however, that the difference determination may in fact be carried out by subtracting the averaged microphone power from the averaged speaker power, and, e.g., taking the negative of the difference power.

By comparing averaged microphone power, averaged speaker power, and difference power during a particular period of time, e.g., a 200 mS frame, (i.e., a second average transmit power, a second average receive power, and a second average difference power) with microphone power, speaker power, and difference power averaged during a previous period of time (i.e., a first average transmit power, a first average receive power, and a first average difference power), a microphone power slope (or transmit slope), speaker power slope (or receive slope), and difference power slope (or difference slope) are determined by subtracting the respective averaged powers taken during the previous period of time, from the respective averaged powers taken during the particular period of time. The comparing of the first and second transmit, receive and difference powers is represented by way of example in equations (4), (5) and (6).

$$mic\_power\_slope = ave\_mic\_R0 - prev\_ave\_mic\_R0 \quad (4)$$
$$spk\_power\_slope = ave\_spk\_R0 - prev\_ave\_spk\_R0 \quad (5)$$
$$diff\_power\_slope = ave\_diff\_R0 - prev\_ave\_diff\_R0 \quad (6)$$

Note that preferably, the previous period of time is a 200 mS frame that begins approximately 20 mS, i.e., 20±5 mS, before the 200 mS frame that constitutes the particular period of time. Thus, the previous and particular periods of time preferably overlap one another by about 180 mS. Note further that for purposes of the invention, the magnitude of the slopes need not be determined—only their signs, i.e., the directions of their changes or slopes, need be determined.

In response to the averaged microphone power, the double-talk detector/echo suppressor 20 generates first and second transmit speech power signals, corresponding to the previous and particular periods of time. The double-talk detector/echo suppressor 20 generates first and second receive speech power signals, corresponding to the averaged speaker power during the previous and particular periods of time. Finally, the double-talk detector/echo suppressor 20 generates first and second difference signals, corresponding to the difference power during the previous and particular periods of time.

In response to the determined microphone power slope, the double-talk detector/echo suppressor 20 generates a microphone power slope signal (or transmit slope signal), and in response to the determined speaker power slope, the double-talk detector/echo suppressor 20 generates a speaker power slope signal (or receive slope signal). Similarly, in response to the determined difference slope, the double-talk detector/echo suppressor 20 generates a difference slope signal.

As illustrated in FIG. 3, the microphone power slope is shown in a top row of graphs; the speaker power slope is shown in a middle row of graphs; and the difference power slope is shown in a bottom row of graphs.

Having thus determined the microphone power slope, speaker power slope, and difference power slope, and in particular the signs of such slopes, it is apparent that eight possible combinations of signs exist, four of which are illustrated in the four columns of graphs shown in FIG. 3. Four other cases are referred to as "not interested" cases for purposes of determining whether a double talk condition exists. Note that the term "not interested" is intended to indicate that the four other cases do not indicate a double talk condition, and is not intended to indicate that the four other cases are unimportant. All eight cases are outlined in Table 1 below:

TABLE 1

| MIC POWER SLOPE | SPK POWER SLOPE | DIFF POWER SLOPE | CONDITION | DOUBLE TALK FLAG |
|---|---|---|---|---|
| 1 | + | + | + | DOUBLE TALK | Y |
| 2 | + | + | − | FAR-END SPEECH | N |
| 3 | + | − | + | NEAR-END SPEECH | N |
| 4 | + | − | − | DOUBLE TALK | Y |
| 5 | − | + | + | NOT INTERESTED | N |
| 6 | − | + | − | NOT INTERESTED | N |
| 7 | − | − | + | NOT INTERESTED | N |
| 8 | − | − | − | NOT INTERESTED | N |

Figure 4:
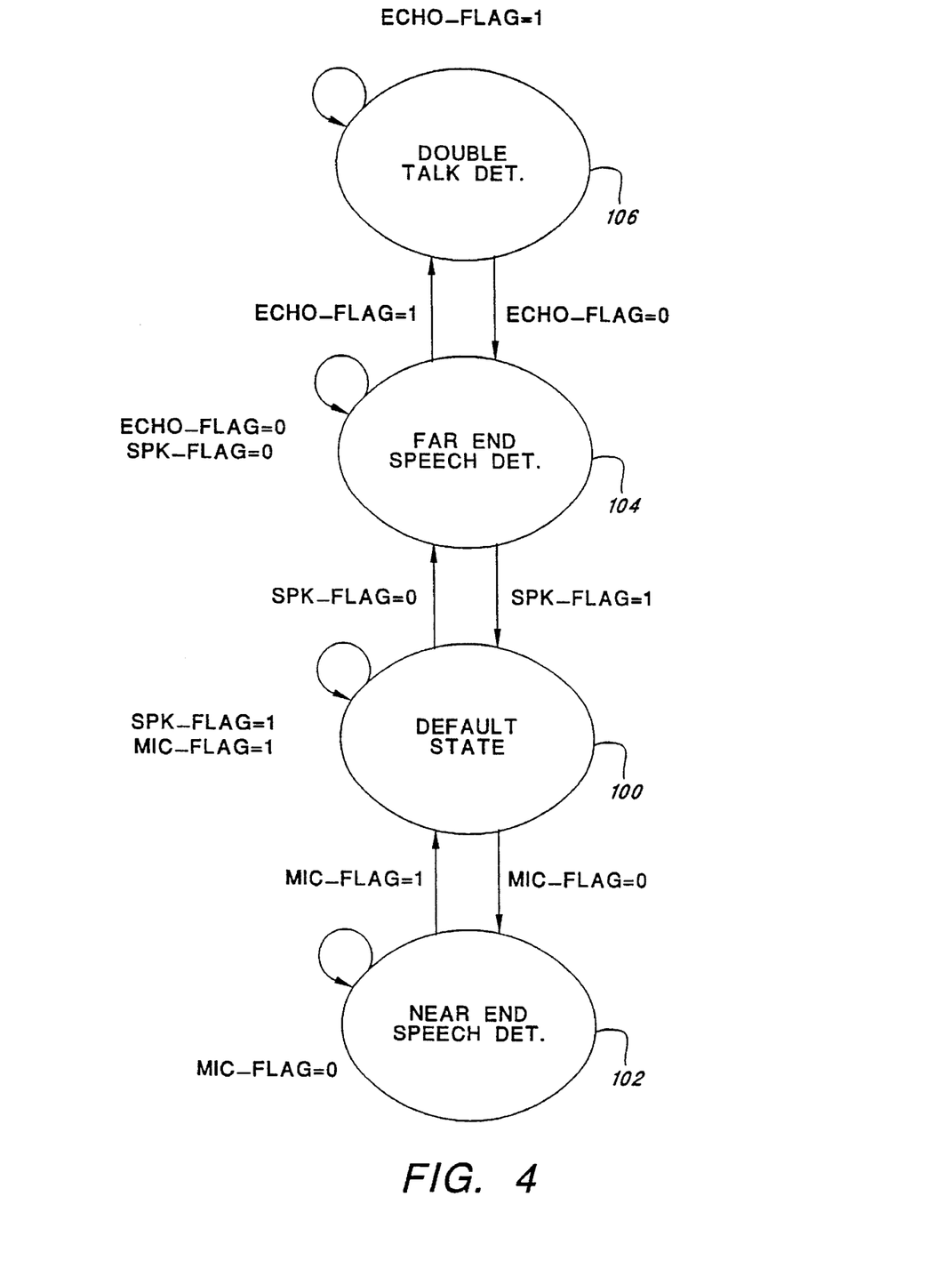
FIG. 4 is a state diagram showing four possible states of the double-talk detector of FIG. 1.

In practice, the double-talk detector/echo suppressor 20 performs in accordance with the state diagram illustrated in FIG. 4. In a default state 100, neither the transmit speech detector 16, nor the receive speech detector 34 detects speech in the outgoing voice signal, or the decoded output signal respectively. In response to the non-detection of speech in the outgoing voice signal, the transmit speech detector 34 generates a "false" microphone flag (also referred to herein as the transmit speech detect signal). Similarly, in response to the non-detection of speech in the decoded output signal, the receive speech detector 16 generates a "false" speaker flag (also referred to herein as the receive speech detect signal). So long as both the microphone flag and the speaker flag remain "false," the double-talk detector/echo suppressor 20 remains in the default state 100.

Figure 5:
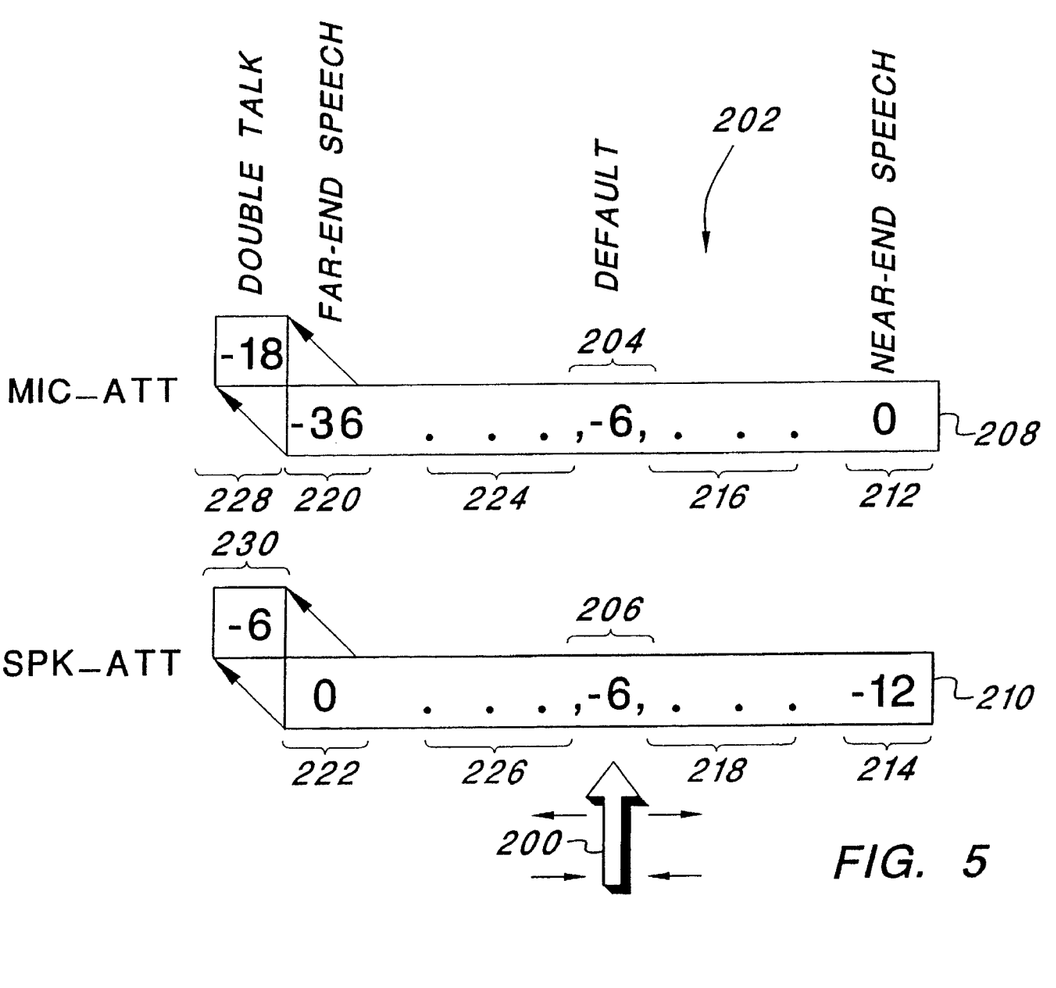
FIG. 5 is a tabular representation of an attenuation table and pointer that are used in response to the four possible states of FIG. 3, as well as of intermediate positions that are assumed by the pointer when the double-talk detector is transitioning back to a default state from a near-end speech detect state or a far-end speech detect state.

In the default state 100, the double-talk detector/echo suppressor 20 sets a pointer 200, shown in FIG. 5 within an attenuation table 202 to a default position 204, 206. The pointer 200 may in practice be a register within the double-talk detector/echo suppressor 20 that points to a location within a memory, e.g., an EEPROM, within the double-talk detector/echo suppressor 20. Such memories and pointers are commonly used by those skilled in the art to implement tables such as the attenuation table 202 of FIG. 5. The table has an upper row 208 that contains a set of transmit attenuation signals that can be applied to the transmit multiplier 32, and a lower row 210 that contains a set of receive attenuation signals that can be applied to the receive multiplier 18. As shown the transmit and receive attenuation signals generated by the double-talk detector/echo suppressor 20 in response to the double-talk detector/echo suppressor 20 being in the default state 100 cause about −6 dB attenuation to be applied to the encoded and decoded output signals by the transmit and receive multipliers 32, 18.

Assuming that the double-talk detector/echo suppressor 20 is in the default state 100, when the transmit speech detector 34 detects speech in the outgoing voice signal, the transmit speech detector 34 sets the microphone flag to "true." In response to the microphone flag becoming "true," the double-talk detector/echo suppressor 20 transitions from the default state 100 to a near-end speech detect state 102. In the near-end speech detect state, the double-talk detector/ echo suppressor 20 moves the pointer 200 within the attenuation table 202 to a near end speech position 212, 214. As can be seen in FIG. 5, when the double-talk detector/echo suppressor 20 is in the near end speech detect state 102, the double-talk detector/echo suppressor 20 causes about 0 dB attenuation to be applied by the transmit multiplier 32 and about −12 dB to be applied by the receive multiplier 18. As a result, the encoded speech signal is not attenuated, thereby allowing the full power of the encoded speech signal to be passed to the cellular transceiver section 11. The cellular transceiver section generates and transmits a cellular signal in response to the encoded speech signal, as is known in the art.

When the transmit speech detector 34 ceases detecting speech in the outgoing voice signal, then the transmit speech detector 34 changes the microphone flag to "false," and the pointer 200 is moved by the double-talk detector/echo suppressor 20 toward the default position 204, 206. The pointer 200, however, does not move immediately back to the default position 204, 206. Instead, the pointer passes through a plurality of, e.g., 20, intermediate positions 216, 218. The intermediate positions 216, 218 cause the double-talk detector/echo suppressor 20 to gradually adjust the attenuations applied by the multipliers 32, 18 from the attenuations applied in the near-end speech position 212, 214, i.e., 0 and −12 dB, to the attenuations applied in the default position 200, i.e., −6 dB and −6 dB. The intermediate positions 216, 218 cause a substantially linear adjustment in the attenuations, with the pointer 200 remaining in each of the intermediate positions 216, 218 for about 20 mS, for a total transition time of about 400 mS. Utilization of the intermediate positions 216, 218 and the total transition time prevents abrupt switching if the attenuation applied by the multipliers 18, 32.

Such transitioning is carried out so long as the double-talk detector/echo suppressor 20 remains in the default state 100 for at least the total transition time, i.e., 400 mS. In the event the microphone flag is set "true," before the total transition time has expired, the double-talk detector/echo suppressor 20 switches to the near-end speech detect state 102 and immediately moves the pointer 200 to the near-end speech position 12, 214, as described hereinabove. Similarly, in the event the speaker flag is set to "true," before the total transition time has expired, the double-talk detector/echo suppressor 20 immediately moves the pointer 200 as described hereinbelow.

If the double-talk detector/echo suppressor 20 is in the default state 100, when the receive speech detector 16 detects speech in the decoded output signal, the receive speech detector 16 sets the speaker flag to "true." In response to the speaker flag becoming "true," the double-talk detector/echo suppressor 20 transitions from the default state 100 to a far-end speech detect state 104 (FIG. 4). In the far-end speech detect state 104, the double-talk detector/echo suppressor 20 moves the pointer 200 within the attenuation table 202 to a far-end speech position 220, 222. As can be seen in FIG. 5, when the double-talk detector/echo suppressor 20 is in the far-end speech detect state 104, the double-talk detector/echo suppressor 20 causes about −45 dB attenuation to be applied by the transmit multiplier 32 and 0 dB to be applied by the receive multiplier 18. As a result, the decoded output signal is not attenuated, thereby allowing the full power of the decoded output signal to be passed to the speaker 22. On the other hand, the encoded output signal is highly attenuated, thereby preventing the full power of the encoded output signal from reaching the cellular transceiver 11. In practice, the encoded output signal may be toggled completely off instead of such high attenuation.

When the receive speech detector 16 ceases detecting speech in the decoded output signal, then the receive speech detector 16 changes the speaker flag to "false," and the pointer 200 is moved by the double-talk detector/echo suppressor 20 toward the default position 204, 206. The pointer 200, again however, does not move immediately back to the default position 200. Instead, the pointer again passes through a plurality of, e.g., 20, intermediate positions 224, 226. The intermediate positions 224, 226 cause the double-talk detector/echo suppressor 20 to gradually adjust the attenuations applied by the multipliers 32, 18 from the attenuations applied in the far-end speech position 220, 222, i.e., −45 dB and 0 dB, to the attenuations applied in the default position 200, i.e., −6 dB and −6 dB. The intermediate positions 224, 226 cause a substantially linear adjustment in the attenuations, with the pointer 200 remaining in each of the intermediate positions 224, 226 for about 20 mS, for a total transition time of about 400 mS.

Such transitioning is carried out so long as the double-talk detector/echo suppressor 20 remains in the default state 100 for at least the total transition time, i.e., 400 mS. In the event the microphone flag is set "true" before the total transition time has expired, the double-talk detector/echo suppressor 20 switches to the near-end speech detect state 102 and immediately moves the pointer 200 to the near-end speech position 212, 214, as described hereinabove. Similarly, in the event the speaker flag is set to "true" before the total transition time has expired, the double-talk detector/echo suppressor 20 switches to the far-end speech detect state 104 and immediately moves the pointer 200 to the far-end speech position 220, 222, as described hereinabove.

While the double-talk detector/echo suppressor 20 is in the far-end speech detect state 104, one other possible state can be entered, the double-talk detect state 106. The double-talk detect state 106 is entered in response to a double talk flag being set to "true" by the double-talk detector/echo suppressor 20. The double-talk flag is manifest in a double-talk flag signal generated within the double-talk detector/echo suppressor 20. As shown in Table 1, above, the double-talk flag is set to "true" when the following conditions are satisfied:

(a) The microphone power slope is positive in sign; and (b) The speaker power slope has a prescribed relationship with the difference power slope, i.e., they are both positive or they are both negative. (Such assumes that the difference power is calculated by subtracting the speaker power from the microphone power. In the event the difference power is calculated by subtracting the microphone power from the speaker power, then in step (b) the prescribed relationship is that the speaker power slope and the difference power slope have opposite signs).

In the event the double-talk flag is set to "true," while the double-talk detector/echo suppressor 20 is in the far-end speech detect state 104, the double-talk detector/echo suppressor 20 switches to the double-talk detect state 106. In response to the double-talk detector/echo suppressor 20 switching to the double-talk detect state 106, the double-talk detector/echo suppressor 20 moves the pointer 200 to a double-talk position 228, 230. In response to the pointer 200 being in the double-talk position 228, 230, the double-talk detector/echo suppressor 20 adjusts the attenuations applied by the multipliers 32, 18. Specifically, as shown in FIG. 5, the double-talk detector/echo suppressor 20 adjusts the attenuation applied by the transmit multiplier 32 to be about −18 dB, and the attenuation applied by the receive multiplier to be about −6 dB. Such attenuations allow some of the encoded output signal to pass to the cellular transceiver 11, and some of the decoded output signal to pass to the speaker 22 while sufficiently attenuating each to prevent echo or feedback.

As soon as the double-talk flag is set to "false" by double-talk detector/echo suppressor 20, due to the above conditions no longer being satisfied, the double-talk detector/echo suppressor 20 returns to the far-end speech detect state 104, and moves the pointer 200 back to the far-end speech position 220, 222, adjusting the attenuations applied by the multipliers accordingly. In this way, the present invention accurately detects and suppresses double-talk-echo in the cellular transceiver section 10.

While the invention herein disclosed has been described by means of specific embodiments and applications thereof, numerous modifications and variations could be made thereto by those skilled in the art without departing from the scope of the invention set forth in the claims.

What is claimed is:

1. A method of detecting double-talk within a cellular mobile unit including:

determining a receive slope of a receive signal in a receive signal path, and generating a receive slope signal in response thereto;

determining a transmit slope of a transmit signal in a transmit signal path, and generating a transmit slope signal in response thereto;

determining a difference slope of a difference signal, and generating a difference slope signal in response thereto, including generating the difference signal in response to evaluating differences between the receive signal and the transmit signal;

generating a double-talk flag signal in the event the transmit slope signal indicates an increasing transmit speech power, and the receive slope signal and the difference slope signal indicate a prescribed relationship in the receive speech power and the difference power.

2. The method of claim 1 wherein said determining said receive slope includes:

measuring a first average receive speech power over a first time period, and generating a first average receive speech power signal in response thereto;

measuring a second average receive speech power over a second time period, and generating a second average receive speech power signal in response thereto; and comparing the first average receive speech power signal to the second average receive speech power signal, and generating said receive slope signal in response thereto, said receive slope signal indicating a change in receive speech power over time.

3. The method of claim 2 wherein said determining said transmit slope includes:

measuring a first average transmit speech power over the first time period, and generating a first average transmit speech power signal in response thereto, measuring a second average transmit speech power over the second time period, and generating a second average transmit speech power signal in response thereto, and comparing the first average transmit speech power signal to the second transmit receive speech power signal, and generating said transmit slope signal in response thereto, said transmit slope signal indicating a change in transmit speech power over time.

4. The method of claim 3 wherein said determining a difference slope includes:

determining a first difference in the first average transmit speech power and the first average receive speech power by subtracting the first average receive speech power from the first average transmit speech power, and generating a first difference signal in response thereto;

determining a second difference in the second average transmit speech power and the second average receive speech power by subtracting the second average receive speech power from the second average transmit speech power, and generating a second difference signal in response thereto; and comparing the first difference signal to the second difference signal and generating said difference slope signal in response thereto, said difference slope signal indicating a change in difference power over time.

5. The method of claim 1 further including:

activating an echo suppressor in response to said generating of said double talk flag signal.

6. The method of claim 5 wherein said activating includes:

increasing attenuation of a decoded output signal in response to which a speaker generates an audible signal; and decreasing attenuation of an encoded output signal in response to which a cellular transceiver transmits a cellular signal.

7. The method of claim 6 including:

deactivating said echo suppressor in the event said receive slope signal and said difference slope signal do not indicate said prescribed relationship between said receive speech power and said difference power.

8. The method of claim 7 wherein said deactivating includes:

increasing attenuation of said decoded output signal in response to which said speaker generates said audible signal; and decreasing attenuation of said encoded output signal in response to which said cellular transceiver transmits said cellular signal.

9. The method of claim 8 including:

detecting voice activity in the decoded output signal;

increasing attenuation of said encoded output signal in the event voice activity is detected in the decoded output signal and said echo suppressor is deactivated; and decreasing attenuation of said encoded output signal in the event voice activity is not detected in the decoded output signal and said echo suppressor is deactivated.

10. The method of claim 9 including:

detecting voice activity of said encoded output signal;

increasing attenuation of said decoded output signal in the event voice activity is detected in the encoded output signal and said echo suppressor is deactivated; and decreasing attenuation of said decoded output signal in the event voice activity is not detected in said encoded output signal and said echo suppressor is deactivated.

11. The method of claim 10 including:

deactivating said echo suppressor in the event said transmit slope signal does not indicate said increasing transmit speech power, said disabling including:

increasing attenuation of said decoded output signal in response to which said speaker generates said audible signal; and decreasing attenuation of said decoded output signal in response to which said cellular transceiver transmits said cellular signal.

12. A device for detecting and suppressing double talk within a cellular mobile unit including:

a communications transceiver;

a receive signal path coupled to the communications transceiver, the receive signal path including means for attenuating the receive signal;

a transmit signal path coupled to the communications transceiver, the transmit signal path including means for attenuating the transmit signal; and a double-talk detector coupled to the receive and transmit signal paths including:

means for determining a receive slope of a receive signal in the receive signal path, and for generating a receive slope signal in response thereto;

means for determining a transmit slope of a transmit signal in the transmit signal path, and for generating a transmit slope signal in response thereto;

means for determining a difference slope of a difference signal, and for generating a difference slope signal in response thereto, the means for determining the difference slope including means for determining the difference signal by evaluating differences between the receive signal and the transmit signal;

means for generating a double-talk flag signal in the event the transmit slope signal indicates an increasing transmit speech power, and the receive slope signal and the difference slope signal indicate a prescribed relationship between the receive speech power and the difference power.

13. The device of claim 12 wherein said means for determining said receive slope includes:

means for measuring a first average receive speech power over the first time period, and for generating a first average receive speech power signal in response thereto;

means for measuring a second average receive speech power over the second time period, and for generating a second average receive speech power signal in response thereto; and means for comparing the first average receive speech power signal to the second average receive speech power signal, and for generating a receive slope signal in response thereto, the receive slope signal indicating a change in receive speech power over time.

14. The device of claim 13 wherein said means for determining said transmit slope includes:

means for measuring a first average transmit speech power over a first time period, and for generating a first average transmit speech power signal in response thereto;

means for measuring a second average transmit speech power over a second time period, and for generating a second average transmit speech power signal in response thereto; and means for comparing the first average transmit speech power signal to the second average transmit speech power signal, and for generating a transmit slope signal in response thereto, the transmit slope signal indicating a change in transmit speech power over time.

15. The device of claim 14 wherein said means for determining said difference slope includes:

means for determining a first difference in the first average transmit speech power and the first average receive speech power by subtracting the first average receive speech power from the first average transmit speech power, and for generating a first difference signal in response thereto;

means for determining a second difference in the second average transmit speech power and the second average receive speech power by subtracting the second average receive speech power from the second average transmit speech power, and for generating a second difference signal in response thereto; and means for comparing the first difference signal to the second difference signal and for generating a difference slope signal in response thereto, the difference slope signal indicating a change in difference power over time.

16. The device of claim 15 wherein:

said means for attenuating said receive signal includes a receive multiplier coupled at one input of said receive multiplier to said double-talk detector, and at another input of said receive multiplier to said communications transceiver; and said means for attenuating said transmit signal includes a transmit multiplier coupled at one input of said transmit multiplier to said double-talk detector, and at an output of said transmit multiplier to said communications transceiver.

17. The device of claim 16 including:

a hands-free speaker coupled to an output of said receive multiplier; and a hands-free microphone coupled to another input of said transmit multiplier.

* * * * *